United States Patent
Wu et al.

[19]

[11] Patent Number: 5,851,937
[45] Date of Patent: Dec. 22, 1998

[54] CLOTH-LIKE TOTALLY BIODEGRADABLE AND/OR COMPOSTABLE COMPOSITES AND METHOD OF MANUFACTURE

[75] Inventors: Pai-Chuan Wu, Cincinnati, Ohio; Philippe Ehret, Fortschwihr, France

[73] Assignees: Clopay Plastic Products Company, Inc., Cincinnati, Ohio; Fiberweb France S.A., Biesheim, France

[21] Appl. No.: 826,007

[22] Filed: Mar. 27, 1997

[51] Int. Cl.$^6$ .................................................. B32B 27/12
[52] U.S. Cl. ......................... 442/394; 156/229; 428/910
[58] Field of Search ........................... 156/229; 428/910; 442/394

[56] References Cited

U.S. PATENT DOCUMENTS

| | | |
|---|---|---|
| 3,484,835 | 12/1969 | Trounstine et al. . |
| 5,196,247 | 3/1993 | Wu et al. ................................... 428/43 |
| 5,200,247 | 4/1993 | Wu et al. ................................. 428/131 |
| 5,202,173 | 4/1993 | Wu et al. ................................. 428/131 |
| 5,382,461 | 1/1995 | Wu ............................................ 428/86 |
| 5,407,979 | 4/1995 | Wu et al. ................................... 524/47 |
| 5,422,172 | 6/1995 | Wu ........................................... 428/230 |
| 5,539,081 | 7/1996 | Gruber et al. ........................... 528/354 |

FOREIGN PATENT DOCUMENTS 2709500  2/1996  France .

*Primary Examiner*—James J. Bell
*Attorney, Agent, or Firm*—Wood, Herron & Evans, L.L.P.

[57] ABSTRACT

A totally biodegradable and/or compostable soft cloth-like composite of totally biodegradable and/or compostable film and totally biodegradable and/or compostable nonwoven and method of manufacture. A totally biodegradable and/or compostable nonwoven fibrous web and a totally biodegradable and/or compostable film are laminated. The laminate is incrementally stretched to produce a totally biodegradable and/or compostable laminate that is softer than that produced when the biodegradable and/or compostable nonwoven web is bonded to the biodegradable and/or compostable film. The soft cloth-like features of the invention are desired in a number of applications including diapers, pants, surgical gowns, sheets, dressings, hygienic products, and the like.

12 Claims, 1 Drawing Sheet

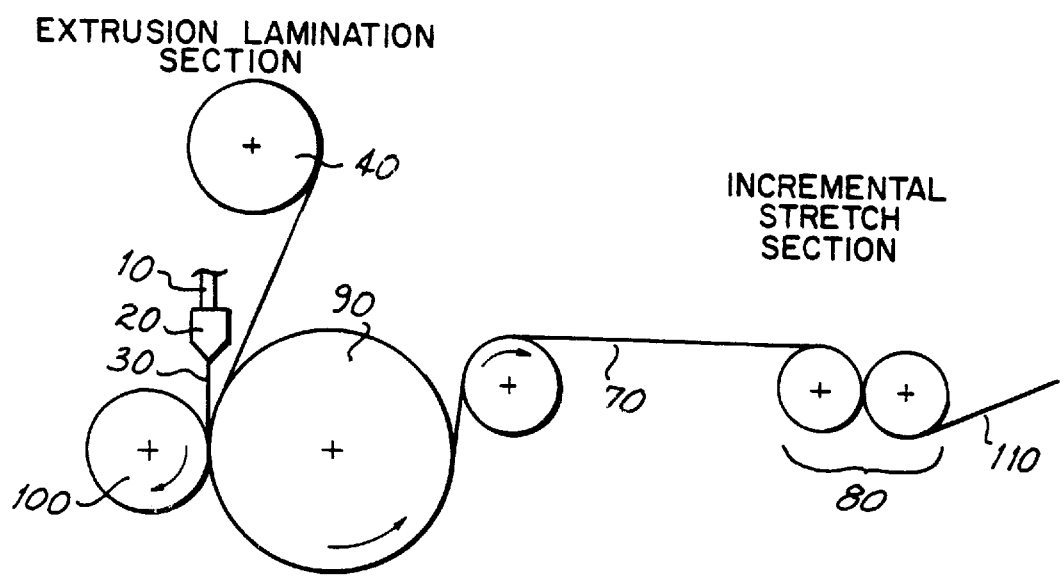

CLOTH-LIKE TOTALLY BIODEGRADABLE AND/OR COMPOSTABLE COMPOSITES AND METHOD OF MANUFACTURE

FIELD OF THE INVENTION

The present invention relates to composites of nonwovens and plastic films that are totally biodegradable and/or compostable and have a soft cloth-like feel, and to processes for their manufacture.

BACKGROUND OF THE INVENTION

Biodegradable and/or compostable products help preserve environmental resources and prevent generation of additional waste. Both manufacturers and consumers are aware of the finite amount of space in landfills and other disposal sites and may affirmatively seek biodegradable and/or compostable products over nonbiodegradable and/or noncompostable products. The need for biodegradability and/or compostability is particularly important in disposable, high use products such as baby diapers, feminine hygiene products, hospital drapes, and the like. However, along with biodegradability and/or compostability, it is important that such products have a soft cloth-like feel for comfort and aesthetic purposes.

The production of films that are biodegradable and/or compostable is known in the prior art. U.S. Pat. No. 5,407,979 discloses a biodegradable thermoplastic film composed of three components: an alkanoyl polymer, destructured starch, and an ethylene copolymer. The components can be extruded and the film can be stretched to form a breathable film. U.S. Pat. No. 5,200,247 discloses a biodegradable thermoplastic film containing an alkanoyl polymer/ polyvinyl alcohol (PVA) blend. U.S. Pat. No. 5,196,247 discloses a compostable polymeric composite sheet and method of making or composting. The composite contains a first and third layer of water insoluble polymer and a middle layer of water soluble polymer.

The production of biodegradable and/or compostable nonwovens is also known in the prior art. U.S. patent application Ser. No. 08/284,001, also the subject of French patent 2.709.500, discloses the use of melt-stable polymers derived from lactic acid to produce a nonwoven material. All filaments are based on polymers derived from L lactic acid and D lactic acid. The polymers are melted and extruded by means of a single screw or twin screw extruder, and conveyed to a spinning pump. The molten polymers then pass through filters and are spun through the spinneret for cooling and drawing. The cooling may be performed by means of chilled air and drawing by means of suction of air or blown air. The draw ratio is generally from two to twenty times. The spinning system is followed by a laydown system which lays the filaments down randomly on the belt. The belt conveys the web to a heated calender to bind the filament and form the nonwoven. The resulting nonwoven is used as a sole or partial component of a disposable article.

The production of melt-stable lactide polymers is disclosed in U.S. Pat. No. 5,539,081. The '081 patent discloses combining lactide polymer chains with a stabilizing agent in the presence of a catalyst to form melt-stable lactide polymers. A melt-stable polymer is one with a low enough viscosity at melt-processing temperatures to be processed in available equipment and with sufficiently low rates of degradation so that degradation does not affect its physical properties or cause equipment fouling. The reaction is well characterized; water and lactide monomer by-products of the reaction are removed by devolitalizing the polylactide, and a stabilizing agent is necessary to decrease depolymerization during the melt processing step.

There remains a need, however, for production of a composite that is totally biodegradable and/or compostable, yet retains a soft cloth-like feel. A composite of this type would find use in hygiene fabrics, e.g., baby diapers, adult incontinence products, feminine hygiene products, and wipes; in medical fabrics, e.g., gowns, drapes, protective clothing, head and shoe coverings, and fluid and particle barriers; and in horticulture and agriculture coverings, e.g., protective ground covers for seedlings, where the products' desirable environmental and tactile properties are sought.

SUMMARY OF THE INVENTION

This invention is directed to a totally biodegradable and/or compostable composite of one or more plies of a totally biodegradable and/or compostable plastic film and one or more plies of a totally biodegradable and/or compostable nonwoven web. The composite is incrementally stretched to provide a soft cloth-like feel.

A totally biodegradable and/or compostable composite is prepared by formulating a totally biodegradable and/or compostable plastic film composition, extruding the composition to form a film, and laminating the film to a totally biodegradable and/or compostable nonwoven. The laminate is incrementally stretched substantially across its length and width and throughout its depth to produce a soft cloth-like feel.

BRIEF DESCRIPTION OF THE FIGURE

The FIGURE shows the manufacturing steps to form a totally biodegradable and/or compostable composite.

DETAILED DESCRIPTION

A. Biodegradable and/or Compostable Film Polymers

Totally biodegradable and/or compostable film-forming polymers, such as a blend of an alkanoyl polymer and polyvinyl alcohol (PVA), are described in U.S. Pat. No. 5,200,247. In addition, blends of an alkanoyl polymer, destructured starch and an ethylene copolymer may be used as the microporous formable polymer, as well as the biodegradable and/or compostable composition described in U.S. Pat. No. 5,407,979. A number of thermoplastic polymers suitable in the practice of this invention are the normally solid oxyalkanoyl polymers or dialkanoyl polymers represented by polycaprolactone (PCL) blended with starch polymers or PVA that may be film-formed. Other totally biodegradable and/or compostable polymers are polylactides (PLA), starch, and polyesters such as polyhydroxy(butyrate) (PHB), polyhydroxy(valerate) (PHV), and mixtures thereof (PHBV).

B. Biodegradable and/or Compostable Nonwovens

The biodegradable and/or compostable nonwovens 40 are preferably melt-stable lactide polymers of the type disclosed in U.S. Pat. No. 5,539,081, that is, polylactide nonwovens (PLA). All the filaments of the nonwoven are made entirely of a polymer or a mixture of polymers derived from lactic acid, that is L lactic acid, D lactic acid, or a mixture of L and D lactic acids. Other nonwovens which are biodegradable and/or compostable include cotton nonwovens, cellulosic nonwovens, and their blends.

The polymers or mixture of polymers derived from lactic acid advantageously have a molecular mass of between 100,000 g/mol and 200,000 g/mol and a polydispersity value of between approximately 1 and approximately 3. In addition, they have a glass transition temperature of between 45° C. and 55° C. and a melting temperature of between 165° C. and 180° C.

By way of example, a polymer A which may be used for the production of a nonwoven in accordance with the invention can be obtained by reacting, in a reactor, lactic acid with a catalyst in the form of stannous octoate that is mixed with the lactic acid in a ratio of 0.11% by weight. Polymer A, which is at a temperature of 209° C. when it leaves the reactor, has a weight-average molecular mass of 132,000 g/mol, a polydispersity value of 1.9, a glass transition temperature of 51.5° C. and a melting temperature of 170° C.

With the operating conditions indicated above it is also possible to obtain a polymer B, derived from lactic acid and capable of being employed for the production of a nonwoven in accordance with the invention, having a weight-average molecular mass of 158,000 g/mol, a polydispersity value of 2.1, a glass transition temperature of 49° C., and a melting temperature of 171.6° C.

As disclosed in the French patent 2.709.500 which is assigned to Fiberweb France, and in U.S. patent application Ser. No. 08/284.001 which is incorporated herein by reference, a solid mass of polymers or a mixture of polymers derived from lactic acid is introduced into a heated extruder. The mass is heated controllably while working it to obtain a homogeneous melt exhibiting a determined viscosity. The melt is conveyed to a die device for forming filaments. The filaments thus obtained are cooled, drawn, and deposited, without preferential orientation, on a traveling collecting belt so as to form a sheet or a nonwoven web. Where appropriate, the filaments are bonded to each other at at least a proportion of their points of intersection and/or treated by immersion, coating, impregnation, or spraying by a calendering station and/or a corresponding treatment station through which the web or nonwoven sheet may pass after its formation.

C. Extrusion Lamination

For purposes of the invention and with reference to the FIGURE, extrusion of the above biodegradable and/or compostable thermoplastic film formulation is achieved by the use of an extruder 10 and a die 20. The die temperature ranges from about 240° F. to 300° F. for a PCL/starch blend, but temperatures depend upon the polymer. The films are slot die extruded using a 2½" extruder 10 at barrel temperatures from about 200° F. to 300° F., again depending upon the polymer. Typically, depending on extrusion conditions, a biodegradable and/or compostable film 30 of this invention is extruded into films from about 1 to 20 mils, preferably 1 to 10 mil. Films of the above mentioned polymers can be produced at approximately 65 fpm line speed when a 2½" extruder 10 is used with a screw speed of approximately 50 rpm. The hereinafter described example of biodegradable and/or compostable film 30 is made according to this procedure. It is to be understood that the extrusion techniques are well known to those versed in the art and need not be discussed in further detail.

D. Incremental Stretching

The composite 70 is incrementally stretched using either diagonal intermeshing, cross direction (CD) intermeshing, or machine direction (MD) intermeshing stretching, as disclosed in U.S. Pat. No. 5,200,247, U.S. Pat. No. 5,202,173, U.S. Pat. No. 5,382,461, and U.S. Pat. No. 5,422,172, all assigned to the assignee of this invention, and each of these disclosures is hereby incorporated by reference in its entirety.

By stretching the extruded biodegradable and/or compostable composite, the molecular structure of the film fractures, creating micropores or microvoids. The microvoid formation causes breathability in the biodegradable and/or compostable thermoplastic film. The breathability allows air and moisture vapor to breathe or pass through the film. Further, the increased surface area provided by stretching the film accordingly enhances the biodegradability and/or compostability of the film.

Various types of stretching techniques can be employed to vary the degrees of breathability and to enhance biodegradability and/or compostability. Upon stretching, the translucent film becomes opaque without the addition of any opacifiers such as titanium dioxide. The opacity of the film is the result of light trapped in the microvoids or micropores caused by the molecular fracture of the biodegradable and/or compostable film.

The biodegradable and/or compostable composite may be stretched in accordance with the incremental stretching techniques described in U.S. Pat. No. 5,202,173 issued on Apr. 13, 1993 to Wu et al., and the details of which are incorporated herein by reference. One of the stretches and techniques disclosed therein is described as follows:

1. Diagonal Intermeshing Stretcher

The diagonal intermeshing stretcher 80 consists of a pair of left hand and right hand helical gear-like elements on parallel shafts. The shafts are disposed between two machine side plates, the lower shaft being located in fixed bearings and the upper shaft being located in bearings in vertically slidable members. The slidable members are adjustable in the vertical direction by wedge shaped elements operable by adjusting screws. Screwing the wedges out or in will move the vertically slidable member respectively down or up to further engage or disengage the gear-like teeth of the upper intermeshing roll with the lower intermeshing roll. Micrometers mounted to the side frames are operable to indicate the depth of engagement of the teeth of the intermeshing roll.

Air cylinders are employed to hold the slidable members in their lower engaged position firmly against the adjusting wedges to oppose the upward force exerted by the material being stretched. These cylinders may also be retracted to disengage the upper and lower intermeshing rolls from each other for purposes of threading material through the intermeshing equipment or in conjunction with a safety circuit which would open all machine nip points when activated.

A drive means is typically utilized to drive the stationary intermeshing roll. If the upper intermeshing roll is to be disengagable for purposes of machine threading or safety, it is preferable to use an antibacklash gearing arrangement between the upper and lower intermeshing rolls to assure that upon reengagement the teeth of one intermeshing roll always fall between the teeth of the other intermeshing roll and potentially damaging physical contact between addendums of intermeshing teeth is avoided. If the intermeshing rolls are to remain in constant engagement, the upper intermeshing roll typically need not be driven. Drive may be accomplished by the driven intermeshing roll through the material being stretched.

The intermeshing rolls closely resemble fine pitch helical gears. In the preferred embodiment, the rolls have 5.935" diameter, 45° helix angle, a 0.100" normal pitch, 30 diametral pitch, 14½° pressure angle, and are basically a long addendum topped gear. This produces a narrow, deep tooth profile which allows up to about 0.090" of intermeshing engagement and about 0.005" clearance on the sides of the tooth for material thickness. The teeth are not designed to transmit rotational torque and do not contact metal-to-metal in normal intermeshing stretching operation.

2. Cross Direction Intermeshing Stretcher

The CD intermeshing stretching equipment is identical to the diagonal intermeshing stretcher with differences in the design of the intermeshing rolls and other minor areas noted below. Since the CD intermeshing elements are capable of large engagement depths, it is important that the equipment incorporate a means of causing the shafts of the two intermeshing rolls to remain parallel when the top shaft is raising or lowering. This is necessary to assure that the teeth of one intermeshing roll always fall between the teeth of the other intermeshing roll and potentially damaging physical contact between intermeshing teeth is avoided. This parallel motion is assured by a rack and gear arrangement wherein a stationary gear rack is attached to each side frame in juxtaposition to the vertically slidable members. A shaft traverses the side frames and operates in a bearing in each of the vertically slidable members. A gear resides on each end of this shaft and operates in engagement with the racks to produce the desired parallel motion.

The drive for the CD intermeshing stretcher must operate both upper and lower intermeshing rolls except in the case of intermeshing stretching of materials with a relatively high coefficient of friction. The drive need not be antibacklash, however, because a small amount of machine direction misalignment or drive slippage will cause no problem. The reasons for this will become evident with a description of the CD intermeshing elements.

The CD intermeshing elements are machined from solid material but can best be described as an alternating stack of two different diameter disks. In the preferred embodiment, the intermeshing disks would be 6" in diameter, 0.031" thick, and have a full radius on their edge. The spacer disks separating the intermeshing disks would be 5½" in diameter and 0.069" in thickness. Two rolls of this configuration would be able to be intermeshed up to 0.231" leaving 0.019" clearance for material on all sides. As with the diagonal intermeshing stretcher, this CD intermeshing element configuration would have a 0.100" pitch.

3. Machine Direction Intermeshing Stretcher

The MD intermeshing stretching equipment is identical to the diagonal intermeshing stretch except for the design of the intermeshing rolls. The MD intermeshing rolls closely resemble fine pitch spur gears. In the preferred embodiment, the rolls have a 5.933" diameter, 0.100" pitch, 30 diametral pitch, 14½" pressure angle, and are basically a long addendum, topped gear. A second pass was taken on these rolls with the gear hob offset 0.010" to provide a narrowed tooth with more clearance. With about 0.090" of engagement, this configuration will have about 0.010" clearance on the sides for material thickness.

4. Incremental Stretching Technique

The above described diagonal intermeshing stretcher 80 may be employed in the following example to produce the incrementally stretched embossed or unembossed biodegradable and/or compostable composite 70. The stretching operation occurs after the biodegradable and/or compostable film 30 is extruded and has solidified to permit incremental stretching. The woven taffeta pattern in accordance with U.S. Pat. No. 3,484,835 may be provided and the biodegradable and/or compostable film is incrementally stretched using the diagonal and/or CD and MD intermeshing stretcher. Upon stretching with one pass through the diagonal intermeshing stretcher 80 with a depth of roller engagement at about 0.085", an embossed film provides post-embossed stretched areas. The original emboss in the unstretched areas is mostly intact. During the stretching process, the thin areas will stretch preferentially to the thick areas due to the lower resistance to the stretching force. In addition, the stretching process weakens and increases the overall area of the biodegradable and/or compostable film by about 44%. Stretched composites having thicknesses of about 1–10 mils are provided. The area increase effected by diagonal stretching consists of dimensional increases in both the machine and cross direction. The weakened biodegradable and/or compostable composite enables degradation to occur more readily, yet the composite is impermeable to water so as to function as a water barrier backsheet for diapers and pads.

EXAMPLE

A totally biodegradable and/or compostable formulation containing 80% polycaprolactone (Union Carbide's Tone Polymer PCL-787) and 20% modified starch ethylene copolymer blend (Novamont's Mater BI-AF05H) was slot die 20 extruded into a film 30 of approximately 1.0–1.2 mil by using a 2½" extruder 10 with a screw speed of approximately 60 rpm and extrusion speed of approximately 60 fpm at a melt temperature of about 300° F. The biodegradable and/or compostable PLA nonwoven rolls 40 were unwound into the extension lamination nip between a metal roller 90 and rubber roller 100 according to the comparative extrusion lamination technique as shown in the extrusion lamination section of the FIGURE.

The laminated composites 70, using the abovementioned polymer A or polymer B nonwovens, were then incrementally stretched in CD and/or MD to produce a totally biodegradable and/or compostable composite with a soft cloth-like feel 110. This is shown in the incremental stretch section of the FIGURE.

Table 1 illustrates various webs intermeshed in both CD (at 0.050" engagement) and MD (0.035" engagement) directions to form a totally biodegradable and/or compostable web such as demonstrated in the following table:

| Totally biodegradable and/or compostable film | 80% PCL (787) 20% Starch Polymer (F05H) | | |
|---|---|---|---|
| Totally biodegradable and/or compostable nonwoven grams/sq. meter (GSM) | 23 GSM PLA NW | 23 GSM PLA NW | 16 GSM PLA NW |
| Composite web before stretching GSM | 62 | 68 | 44 |
| Composite web after CD and MD stretching GSM | 47 | 44 | 38 |

Other variations or embodiments of this invention will become apparent to one of ordinary skill in the art in view of the above description, and the foregoing embodiments are not to be construed as limiting the scope of this invention.

What is claimed is:

1. A totally biodegradable and/or compostable soft cloth-like composite comprising one or more plies of a totally biodegradable and/or compostable plastic film and one or more plies of a totally biodegradable and/or compostable nonwoven web, said composite having incrementally stretched portions substantially across its length and width and throughout its depth to provide a soft cloth-like feel to the composite.

2. The composite of claim 1 wherein (a) said totally biodegradable and/or compostable nonwoven comprises a polymer selected from the group consisting of a polymer of entirely L lactic acid, a polymer of entirely D lactic acid, a copolymer of L lactic acid and D lactic acid, and a blend of polymers of L lactic acid and D lactic acid; and (b) said totally biodegradable and/or compostable plastic film composition is selected from the group consisting of polyvinyl alcohol (PVA), polycaprolactone (PCL), starch, a blend of starch and PVA, a blend of starch and PCL, a blend of PCL and PVA, a blend of PLA, starch, polyesters such as polyhydroxy(butyrate) (PHB), polyhydroxy(valerate) (PHV), and mixtures thereof (PHBV).

3. A method of producing a totally biodegradable and/or compostable soft cloth-like composite comprising:

formulating a totally biodegradable and/or compostable plastic film composition;

extruding said composition to form a film;

laminating said film to a totally biodegradable and/or compostable nonwoven web to form a totally biodegradable and/or compostable laminate; and incrementally stretching portions of said laminate across its length and width and throughout its depth to produce said soft cloth-like composite.

4. The method of claim 3 wherein said totally biodegradable and/or compostable nonwoven comprises a polymer selected from the group consisting of a polymer of entirely L lactic acid, a polymer of entirely D lactic acid, a copolymer of L lactic acid and D lactic acid, and a blend of polymers of L lactic acid and D lactic acid.

5. The method of claim 3 wherein said totally biodegradable and/or compostable plastic film composition is selected from the group consisting of polyvinyl alcohol (PVA), polycaprolactone (PCL), starch, a blend of starch and PVA, a blend of starch and PCL, a blend of PCL and PVA, a blend of PLA, starch, polyesters such as polyhydroxy(butyrate) (PHB), polyhydroxy(valerate) (PHV), and mixtures thereof (PHBV).

6. The method of claim 3 wherein said laminate is incrementally stretched in the cross direction.

7. The method of claim 3 wherein said laminate is incrementally stretched in the machine direction.

8. The method of claim 3 wherein said laminate is incrementally stretched in the cross direction and the machine direction.

9. A method of producing a totally biodegradable and/or compostable soft cloth-like composite comprising:

blending 80% PCL and 20% starch polymer to form a totally biodegradable and/or compostable plastic film composition;

extruding said composition by slot die extrusion into a film of approximately 1.0–1.2 mils;

laminating said film to a totally biodegradable and/or compostable polylactide nonwoven web; and incrementally stretching portions of said laminate across its length and width and throughout its depth to produce said soft cloth-like composite.

10. The method of claim 9 wherein said laminate is incrementally stretched in the cross direction.

11. The method of claim 9 wherein said laminate is incrementally stretched in the machine direction.

12. The method of claim 9 herein said laminate is incrementally stretched in the cross direction and the machine direction.

* * * * *